US008448390B1

(12) United States Patent
Clemens

(10) Patent No.: US 8,448,390 B1
(45) Date of Patent: May 28, 2013

(54) CATENARY CABLE SOLAR PANEL SUSPENSION SYSTEM

(75) Inventor: Jonathan A. Clemens, Port Townsend, WA (US)

(73) Assignee: Olympic Energy Systems, Inc., Port Townsend, WA (US)

( * ) Notice: Subject to any disclaimer, the term of this patent is extended or adjusted under 35 U.S.C. 154(b) by 0 days.

(21) Appl. No.: 13/415,213

(22) Filed: Mar. 8, 2012

Related U.S. Application Data

(60) Provisional application No. 61/452,832, filed on Mar. 15, 2011.

(51) Int. Cl.
 *E04D 13/18* (2006.01)
 *F24J 2/52* (2006.01)

(52) U.S. Cl.
 USPC .......................... 52/173.3; 136/245; 126/623

(58) Field of Classification Search
 USPC ................... 52/173.3, 83; 136/245; 126/623; 211/119.15, 119.1, 119.01
 See application file for complete search history.

(56) References Cited

U.S. PATENT DOCUMENTS

| 2,896,792 | A | * | 7/1959 | Bodine | 211/119.15 |
| 2,999,340 | A | | 9/1961 | Maculan | |
| 3,215,279 | A | * | 11/1965 | Leo | 211/119.15 |
| 3,288,158 | A | * | 11/1966 | Gugliotta | 135/87 |
| 4,233,961 | A | | 11/1980 | Kelly | |
| 4,457,035 | A | * | 7/1984 | Habegger et al. | 14/18 |
| 4,832,001 | A | * | 5/1989 | Baer | 126/579 |
| 6,237,241 | B1 | | 5/2001 | Aaron | |
| 7,285,719 | B2 | | 10/2007 | Conger | |
| D605,585 | S | * | 12/2009 | Conger | D13/102 |
| 8,381,464 | B2 | * | 2/2013 | Conger | 52/173.3 |
| 2008/0168981 | A1 | * | 7/2008 | Cummings et al. | 126/600 |
| 2008/0283112 | A1 | * | 11/2008 | Conger | 136/244 |
| 2008/0283113 | A1 | * | 11/2008 | Conger | 136/244 |
| 2009/0038672 | A1 | * | 2/2009 | Conger | 136/244 |
| 2010/0089433 | A1 | * | 4/2010 | Conger | 136/244 |
| 2010/0269428 | A1 | * | 10/2010 | Stancel et al. | 52/173.3 |
| 2010/0294265 | A1 | * | 11/2010 | Baer et al. | 126/680 |
| 2011/0197418 | A1 | | 8/2011 | Overturf et al. | |
| 2011/0214368 | A1 | * | 9/2011 | Haddock et al. | 52/173.3 |
| 2012/0073219 | A1 | * | 3/2012 | Zuritis | 52/173.3 |
| 2012/0124922 | A1 | * | 5/2012 | Cusson et al. | 52/173.3 |

* cited by examiner

*Primary Examiner* — Christine T Cajilig
(74) *Attorney, Agent, or Firm* — Virginia P. Shogren

(57) ABSTRACT

A system of suspended photovoltaic modules relative to a surface wherein modules are suspended generally parallel and spaced apart along the length of dual pairs of catenary cables. A hanger assembly permits initial attachment of a module during installation as the cables are mounted to the rear surfaces of the modules via mid clamp assemblies. End clamp assemblies attach the modules to the cables proximate stanchions having two spaced posts joined by cross beams, a top cross beam angled to define an inclined plane. The respective pairs of cables supporting the modules are joined with cable cross ties to form a catenary shape. The modules may be suspended in a generally consistent inclined plane or a slightly concave curve. The catenary cables and clips are sized and shaped to allow the modules limited sway movement as necessary to reduce stresses and forces during wind or other adverse weather events.

20 Claims, 9 Drawing Sheets

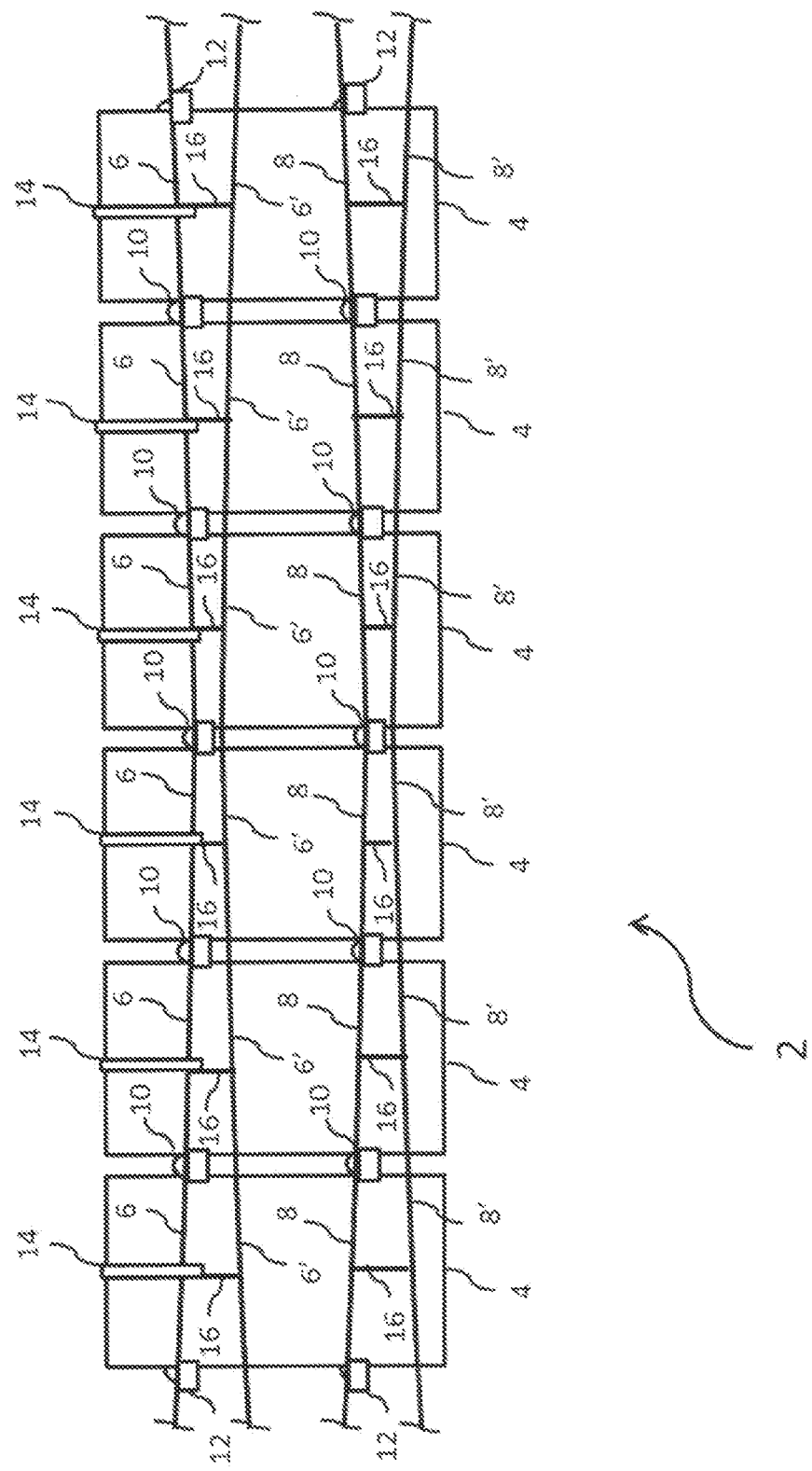

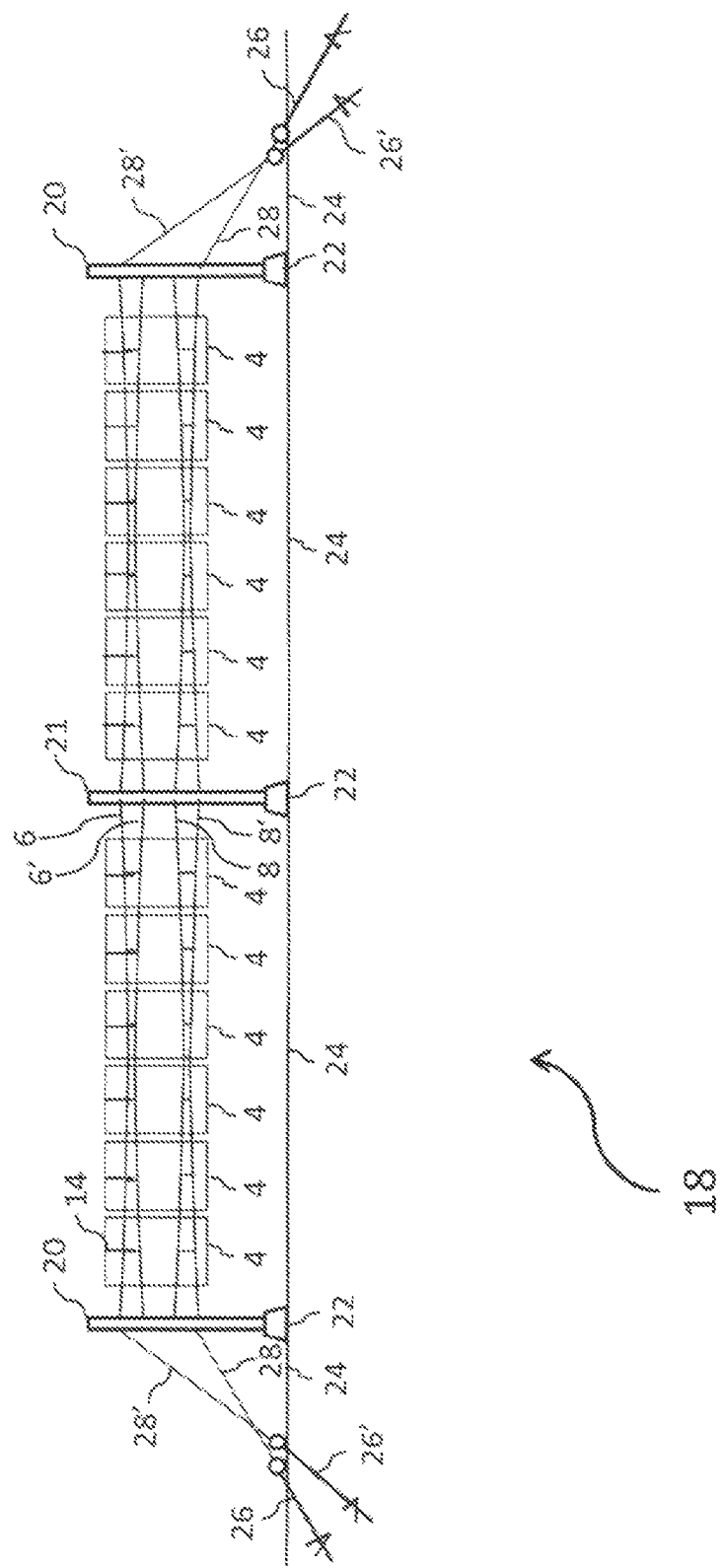

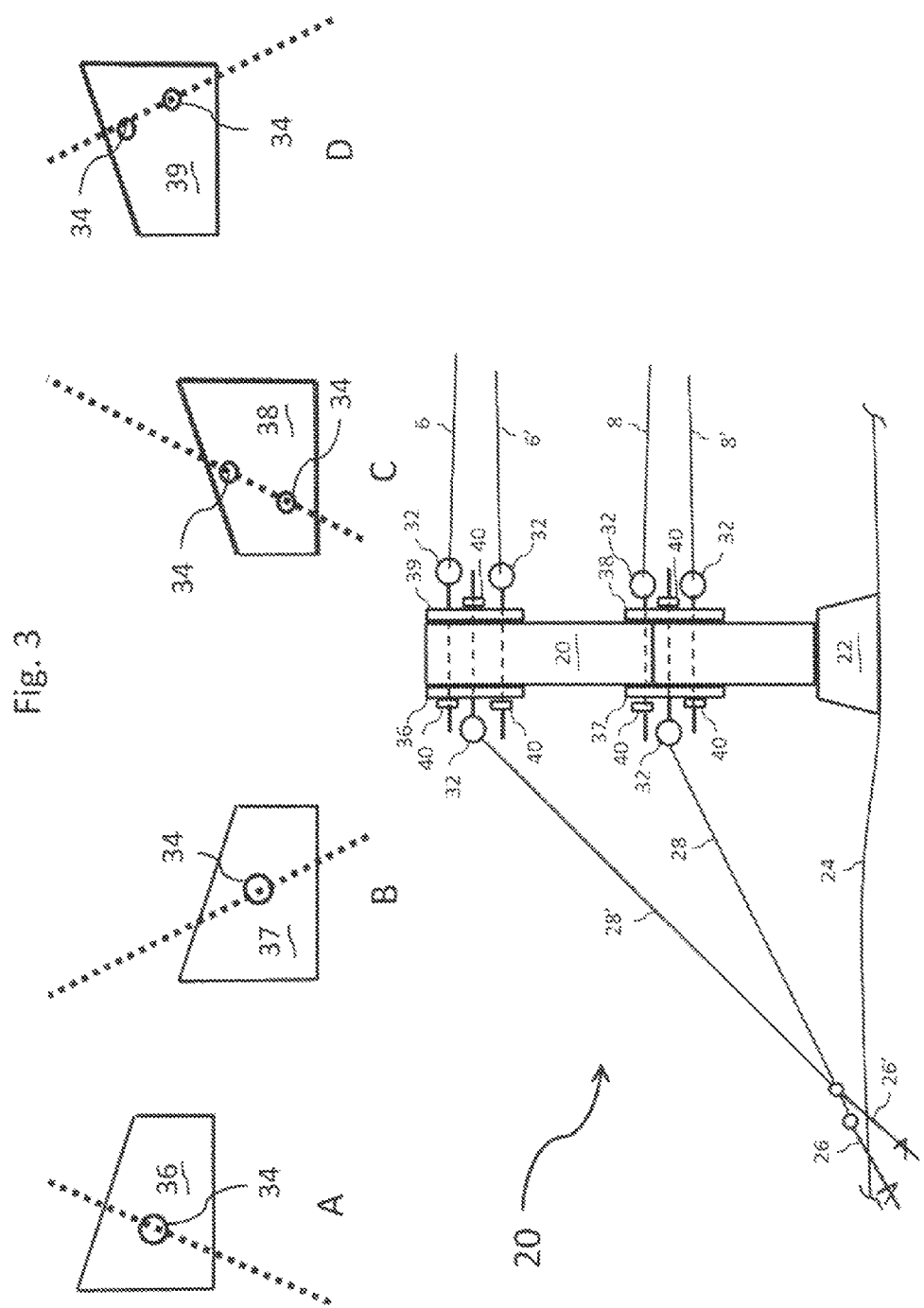

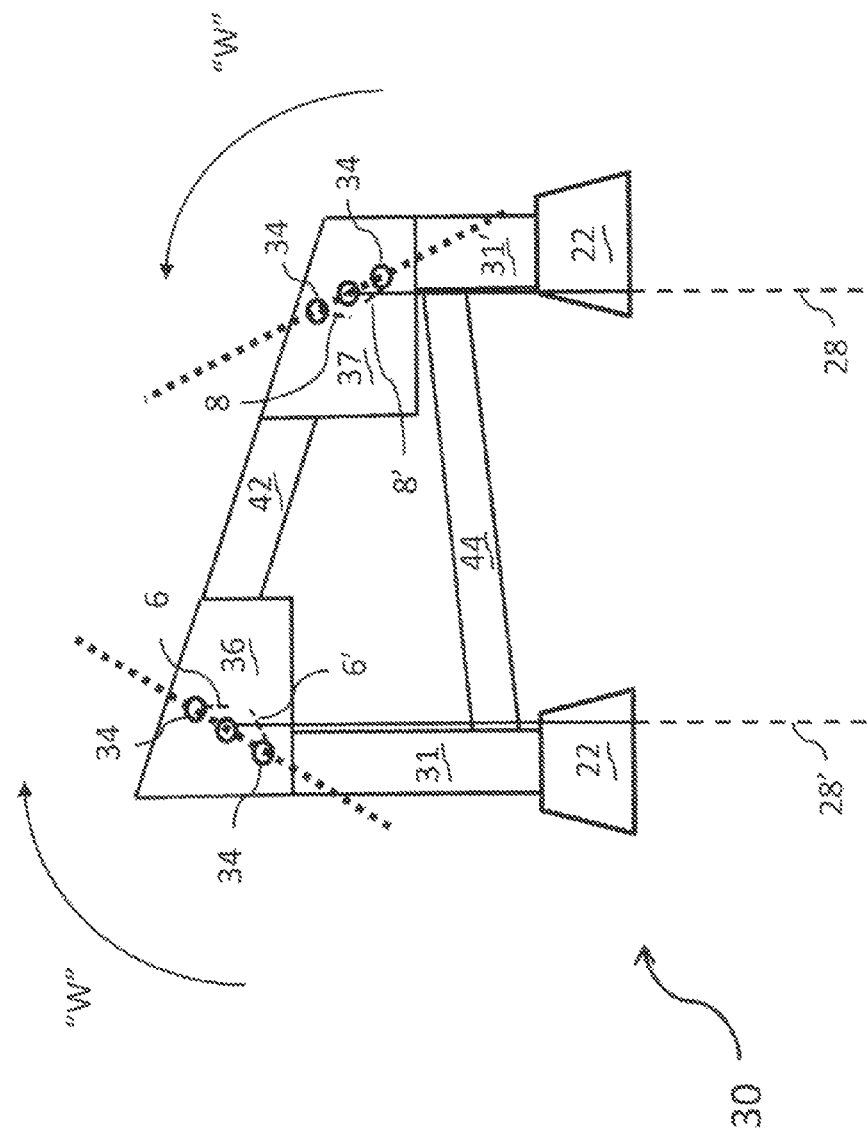

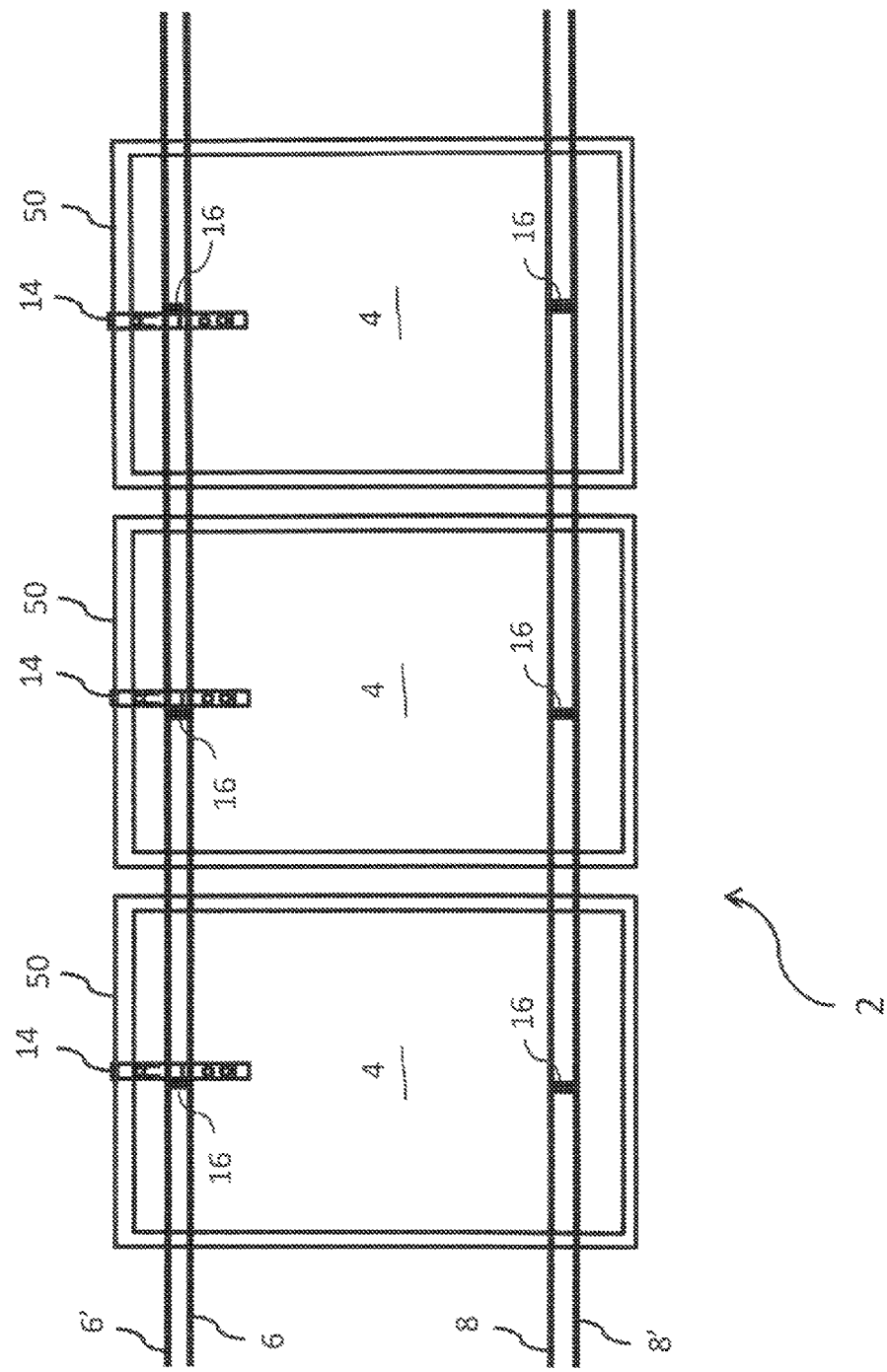

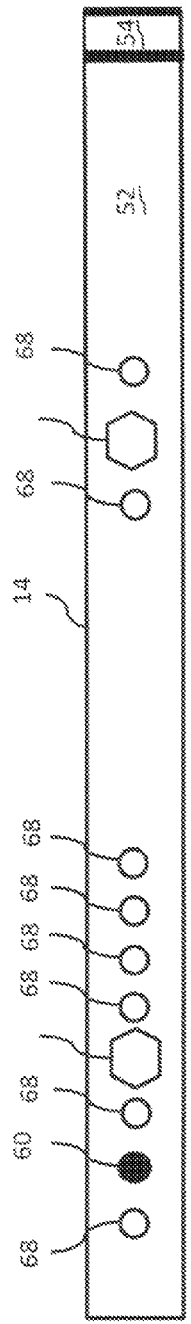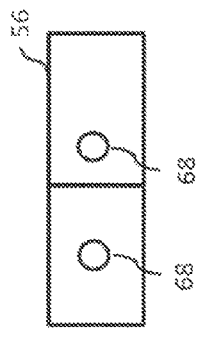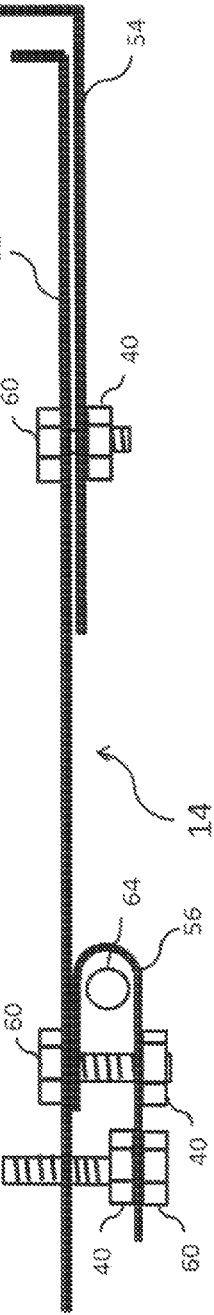
Fig. 6A
Fig. 6C
Fig. 6B
Fig. 6D

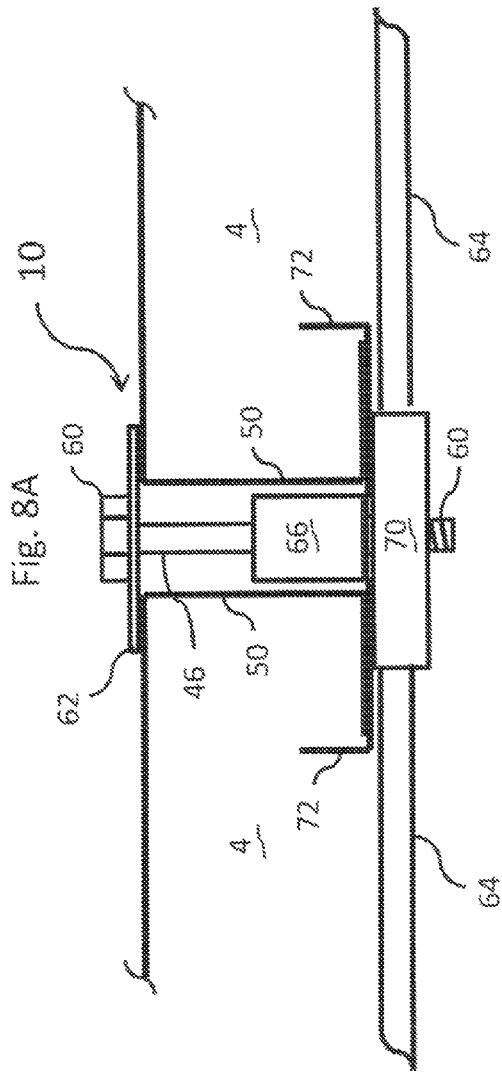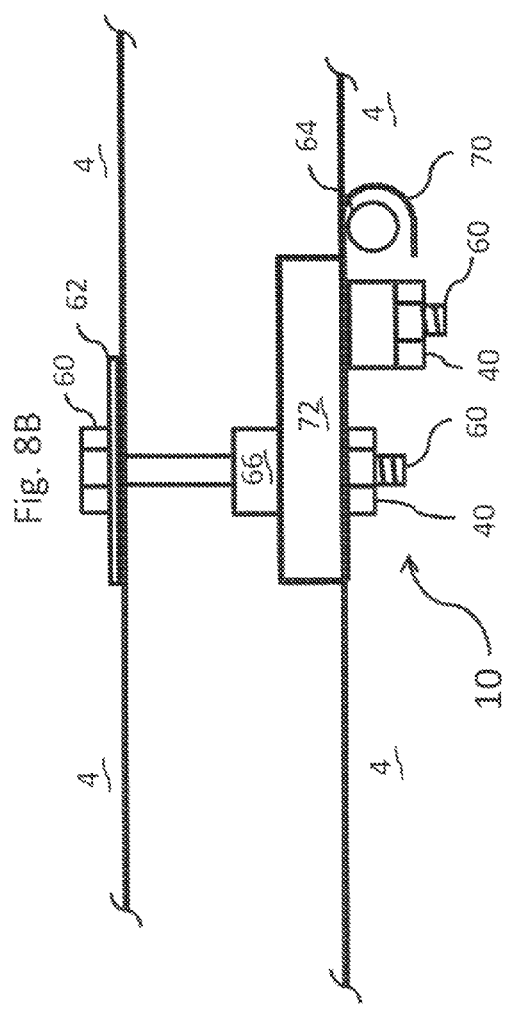

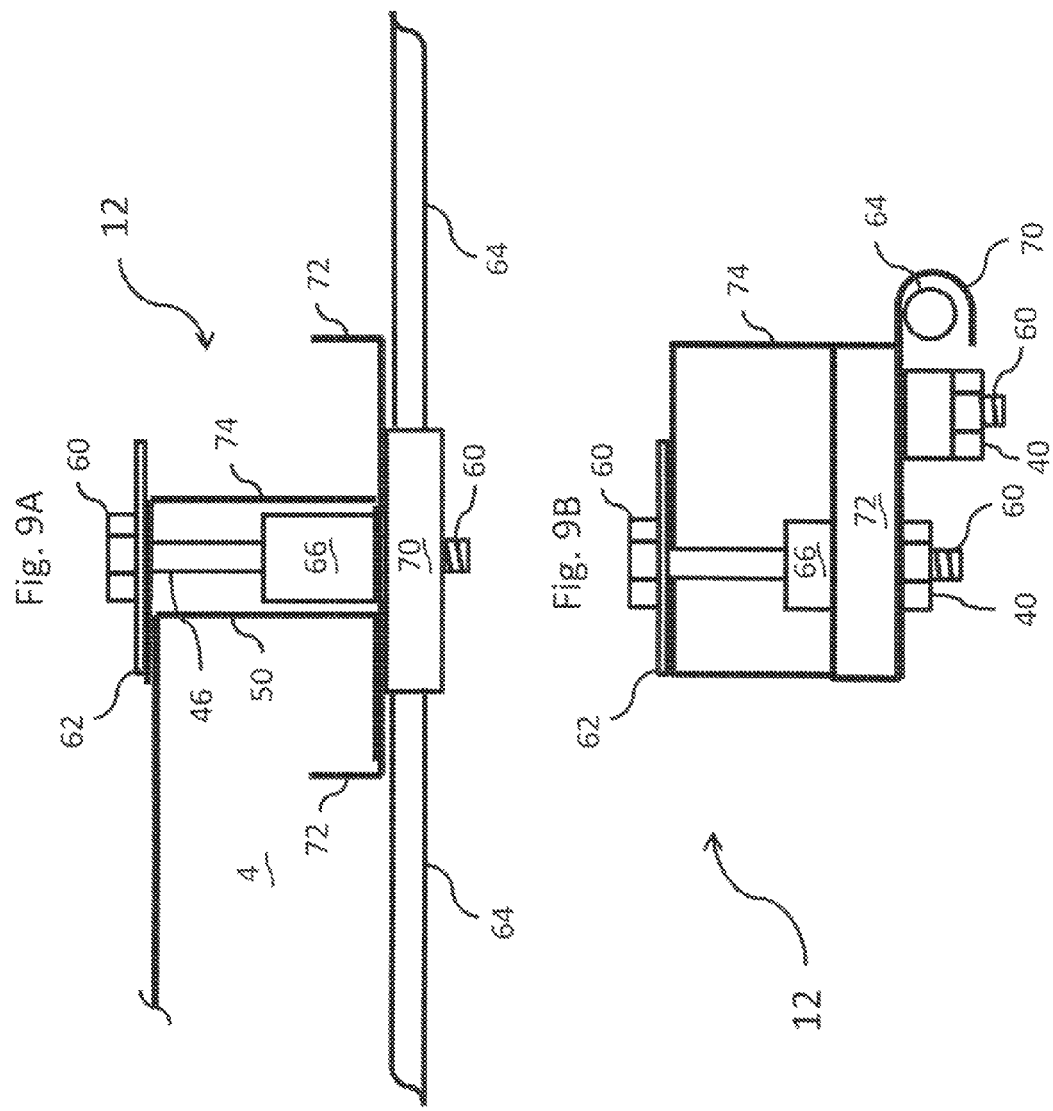

CATENARY CABLE SOLAR PANEL SUSPENSION SYSTEM

CROSS REFERENCE TO RELATED APPLICATION

This application claims priority under 35 USC 119(e) of U.S. Provisional Patent Application Ser. No. 61/452,832 filed Mar. 15, 2011, entitled "Dual Opposing Catenary Solar Panel Mounting System" by the same inventor, hereby incorporated by reference in its entirety.

FIELD OF THE INVENTION

This invention relates generally to the mounting and securing of solar energy collectors such as photovoltaic panels, and more particularly to an above surface/ground mounting system that suspends panels via dual pairs of cables under tension forming a general catenary shape.

BACKGROUND OF THE INVENTION

Typical solar panel ground mounting systems require extensive infrastructure to support and position the panels laterally to form a consistent angle above the ground. Each panel must be supported along the length of the array. To support the panels in this perfectly planar, above-ground position, typical ground mount systems require days of labor and significant infrastructure in the manner of buried posts, rails, and other securely mounted materials sufficient to support the weight of the panels, on the one hand, and prevent movement of the panels in all weather conditions, on the other hand. As a result, typical ground mount systems are cost-prohibitive relative to existing costs for grid-supplied electrical energy.

These over-engineered systems are also difficult to move or remove. Solar panel systems may need to be adjusted or moved to maximize solar collection. As an example, trees may grow and block the sunlight to the panels, requiring an owner to cut down the trees, where possible, as opposed to moving the panels themselves. Existing typical ground mount systems are extensively ground-connected and cannot be moved without great difficulty and expense to the owner.

Accordingly, there is an as of yet unmet need in the art for a solar panel ground mounting system that: 1) requires a minimum of parts, materials and hardware to retain the panels in a desired position; 2) may be installed and removed in a minimum amount of time; 3) may be installed on any ground (earthen) surface without the need for posts buried in the ground or in concrete; 4) is cost effective, and not cost-prohibitive, relative to existing costs for grid-supplied energy; and, 5) allows for more solar power collection at different times of the year.

THE INVENTION

Summary of the Invention

The inventive Catenary Cable Solar Panel Suspension System comprises at least two generally planar photovoltaic modules, each of the modules having a top margin, a bottom margin, a left margin and a right margin, a front surface and a rear surface. Respective side margins of the modules, when suspended generally parallel and spaced apart from each other, define a central open region between two modules, and opposing open end regions.

A first pair of opposing, spaced cables comprise a first cable and a second cable, each of said cables having opposing ends. A second pair of opposing, spaced cables comprise a third cable and a fourth cable, each of said cables having opposing ends. A hanger assembly is mounted to the rear surface of the module, said hanger assembly having a first end securely spanning the top margin of the module, and a second end encircling the first cable. A first mid clamp assembly is positioned within the central region retaining side margins of the modules.

The first mid clamp assembly encircles the first cable. A second mid clamp assembly is positioned within the central region retaining side margins of the modules. The second clamp assembly encircles the third cable. A series of end clamp assemblies are positioned at the end region, each of the end clamp assemblies retaining a side margin of a module and encircling the first and third cables, respectively.

The cable ends are securely attached under tension to spaced bolts on opposing end stanchions positioned at the end regions. Ground cables extend under tension from a surface mount to the stanchions.

A first plurality of spaced cable cross ties are mounted generally perpendicular to the first and second cables, each of the first cable cross ties adjusted under a different tension to cause the first and second cables to take on a catenary shape between the two opposing stanchions. Likewise, a second plurality of spaced cable cross ties are mounted generally perpendicular to the third and fourth cables, each of the bottom cable cross ties adjusted under a different tension to cause the third and fourth cables to take on a catenary shape between the two opposing stanchions.

A level of tension in the first pair of cables acting in coordination with a level of tension in the second pair of cables supports the panels in an elevated position above the surface and prevents a catastrophic motion of the panels in a high wind condition.

BRIEF DESCRIPTION OF THE DRAWINGS

The invention is described in more detail with reference to the attached drawings, in which:

FIG. 1 is a partial rear side view diagram of an exemplary catenary cable solar panel suspension system with dual pairs of catenary cables;

FIG. 2 is a rear view diagram of an exemplary catenary cable solar panel suspension system with pass through stanchion;

FIG. 3 is a partial front elevation view diagram of an end stanchion assembly with thrust plates and eye bolt tensioners;

FIG. 4 is a side view diagram of an exemplary end stanchion assembly;

FIG. 5 is a bottom view diagram of three pv panels suspended by pv hanger assemblies on a cable during installation;

FIG. 6A is a top view diagram of a hanger assembly;
FIG. 6B is a top view diagram of a hanger clamp;
FIG. 6C is a top view diagram of a hanger hook;
FIG. 6D is a side view diagram of the hanger assembly;
FIG. 8A is a top view diagram of a mid clamp assembly;
FIG. 8B is a side view diagram of a mid clamp assembly;
FIG. 9A is a top view diagram of an end clamp assembly; and,
FIG. 9B is a side view diagram of an end clamp assembly.

DETAILED DESCRIPTION OF THE ILLUSTRATIVE EMBODIMENT

Figure 7:
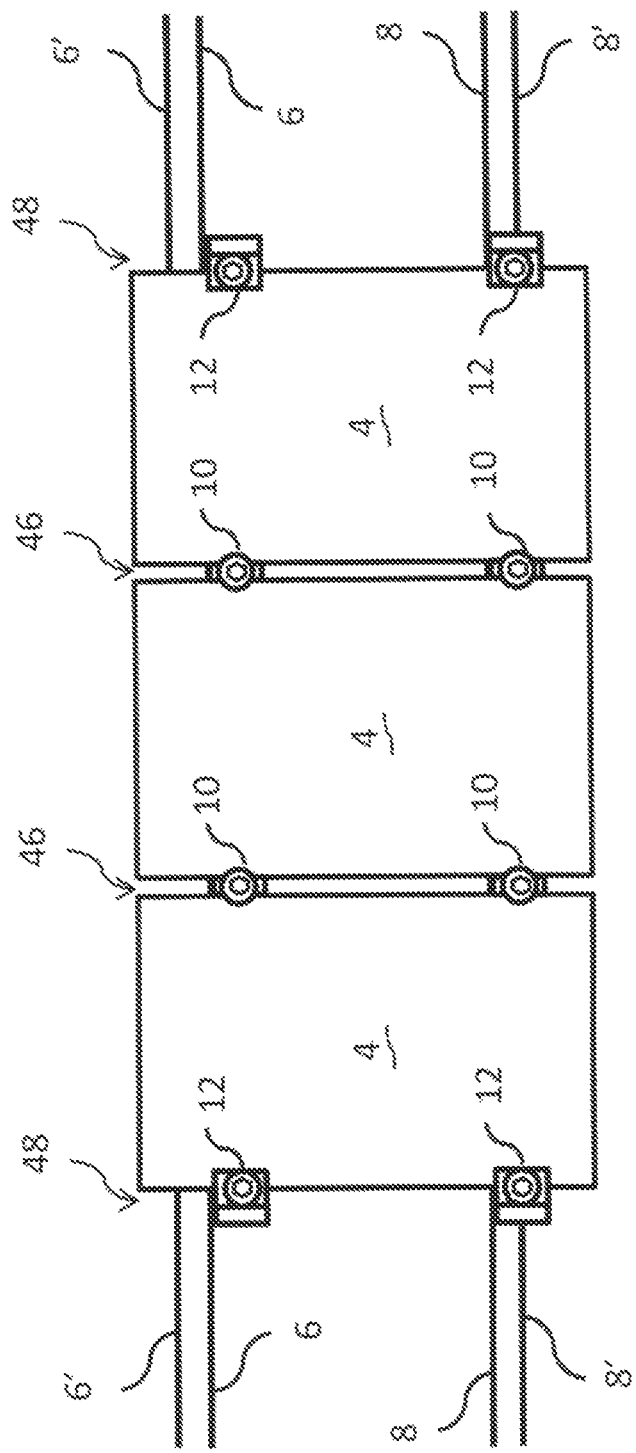
FIG. 7 is a front elevation view diagram of three panels suspended on cables via mid clamp assemblies and end clamp assemblies.

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the diagrams show in schematic, or omit, parts that are not essential in that diagram to a description of a particular feature, aspect or principle of the invention being disclosed. Thus, the best mode embodiment of one feature may be shown in one diagram, and the best mode of another feature will be called out in another diagram.

Catenary Cable Solar Panel Suspension System

In general terms, the Catenary Cable Solar Panel Suspension System is a surface/ground mounting system for suspending solar photovoltaic modules between opposing stanchions, the modules retained and supported by dual pairs of cables under tension. The respective pairs of cables are linked with cable cross ties along their length at differing tension levels to form opposing catenary curves. A catenary curve is an idealized shape that a hanging chain or cable assumes under its own weight when supported only at its ends. The curve has a broad, C-like shape, superficially similar in appearance to the base of a wide parabola. The cable cross ties are progressively tightened towards the center point of the suspended modules, thereby providing maximum tension at a distance furthest from the support stanchions. Tension may further be reduced, where desired, to allow the panels to sag.

The system provides for significant ecological advances by utilizing significantly less material than conventional mounting systems. The system is further adaptable in size, extending from small scale installations of less than 1 kilowatt, to large arrays providing a power source in excess of 100 kilowatts. In addition, the dual span configuration of mounting cables enables a single series-wired PV string, or array, to be easily connected to the electrical grid through a commercial off-the-shelf string inverter.

FIG. 1 shows a rear view of an exemplary catenary cable system 2 with dual pairs of catenary cables 6/6', 8/8' supporting an array of photovoltaic panels 4, according to the invention. Referring to FIG. 1, the two respective pairs of cables 6/6', 8/8' are linked with a series of cable cross ties 16 spaced along the length of the cables 6/6', 8/8' to provide additional tension. The cable cross ties 16 are mounted generally perpendicular to the cables 6/6', 8/8' and are adjusted under different tension levels to cause the cable pairs to take on symmetrical catenary curves along their length when suspended between two opposing stanchions (shown in FIG. 2). The resulting cable shape is both curved and tapered towards the center, with the weight of the panels 4 distributed over the length of the cables 6/6', 8/8'. The pairs of cables 6/6', 8/8' work together to control and prevent lift and sideways motion of the panels 4 in high wind conditions.

Referring to FIG. 1, the preferred cable 6/6', 8/8' material is galvanized ¼ inch steel cable; however, any desired or suitable cable material and diameters may be utilized, including, without limitation, stainless steel cable, wire ropes, and/or nylon ropes. The cable cross ties 16 may be made of strap metal material capable of secure connection to the cables 6/6', 8/8', including without limitation, brass, aluminum, other metals, other non-stretchable materials, turnbuckles, or other connection devices.

The panels 4 may be monocrystalline silicon photovoltaic panels, polycrystalline silicon panels, string ribbon silicon panels, thin-layer silicon panels, amorphous silicon panels, Group III Element panels, Group IV Element panels, concentrator modules, high-efficiency multi-junction modules, flat-plate stationary arrays, adjustable arrays, portable arrays, tracking arrays, and/or reflector modules.

Referring to FIG. 1, the panels 4 are attached to the cables 6/6', 8/8' via a hanger assembly 14, discussed in detail in connection with FIGS. 6A-6D, infra, mid clamp assemblies 10, discussed in detail in connection with FIGS. 8A-8B, infra, and end clamp assemblies 12, discussed in detail in connection with FIGS. 9A-9B, infra.

FIG. 2 shows a rear view of a system 18 comprising two sets of suspended panels 4 held under tension between stanchions 20, including a center, pass-through stanchion 21. As shown in FIG. 2, the catenary shape of the cables 6/6', 8/8' is maximized along a length of the cables at a mid point generally equidistant between each pair of spaced stanchions 20/21. The cables 6/6', 8/8' are securely attached under tension to spaced bolts (shown in FIG. 3) on the stanchions 20.

Referring to FIG. 2, the end stanchions 20 are above ground level 24, supported with ground cables 28/28' mounted under tension via earth anchors 26/26'. Turnbuckles (not shown) are used as tensioners on the ground cables 28/28'. While the ground cables 28/28' of FIG. 2 are shown attached to earth anchors 26/26', it should be understood that any suitable or desired ground or surface connection may be utilized to provide tension on the stanchion 20, including without limitation, a buried block of pre-cast concrete or sub-surface poured concrete. In addition, while the system 18 shown in FIG. 2 discloses a ground connection 24 at the earth anchors 26, it should be understood that the system 18 may be installed above any suitable or desired surface, including without limitation, earth, asphalt, composition, metal, tile, SIP panel, or decking.

As shown in FIG. 2, each panel 4 is suspended on dual pairs of catenary cables 6/6', 8/8'. The suspended panels 4 define a generally consistent inclined (angled) plane between the stanchions 20/21 relative to the ground surface 24, as further discussed in connection with FIG. 4, infra. The tension on the cables 6/6', 8/8' between the stanchions 20/21 may be very high to support the panels 4 in a generally flat plane relative to each other. Alternately, the panels 4 may sag on the cables 6/6', 8/8' to form a generally slightly concave curve relative to each other in their suspended positions between the stanchions 20/21.

FIG. 3 shows a front elevation view of an end stanchion 20 with thrust plates 36/39, 37/38, eye bolts 32 and cables 28/28', 6/6', 8/8'. As shown in FIG. 3, a top thrust plate 39 carries and distributes the force between one pair of cables 6/6', while a bottom plate 38 carries and distributes the force between the lower pair of cables 8/8'. The thrust plates 38, 39 maintain tension in the cables 6/6', 8/8' without the need for turnbuckles.

Referring to FIG. 3, the eyebolts 32 span opposing pairs of thrust plates 36/39, 37/38 as well as the body of the stanchion 20, and are secured with nuts 40. Tension forces on both sides of the stanchion 20 are balanced between the ground cables 28/28' on the one hand, and the catenary cables 6/6', 8/8' on the other hand, via adjustable turnbuckle tensioners (not shown) on the ground cables 28/28'.

Referring to FIG. 3, side views of the thrust plates are shown in diagrams marked "A", "B", "C" and "D." As shown in diagrams "A", "B", "C" and "D", the thrust plates 36, 37, 38, 39 are trapezoidal in shape. Thrust plates 36 "A" and 37 "B" each define a single, generally centered hole opening 34. Thrust plates 38 "C" and 39 "D" each define a pair of spaced hole openings 34. The hole openings 34 represent the location of the eye bolts 32 inserted into and through the stanchion 20 with corresponding tension applied at the location of the eye bolt 32 due to the cable connections.

Referring to FIG. 3, the dashed lines in diagrams "A", "B", "C" and "D" represent a direction of maximum resistance to panel movement applied to the respective plates 36, 37, 38, 39 when the stanchion 20 is under stress from the ground cables 28/28' on the one hand, and the catenary cables 6/6', 8/8' on the other hand. As shown in FIG. 3, the tension forces (dashed lines) of the respective pairs of thrust plates 36/39, 37/38 on opposing sides of the stanchion 20 match and cancel each other out such that the stanchion 20 is retained in a vertical, stationary and secure position above ground level 24 with support only from a concrete base 22. The relative angle of the two dashed lines (upper and lower pairs of cables) is as near perpendicular as possible, for maximum stability.

FIG. 4 shows a side view of an exemplary stanchion assembly 30, according to the invention. As shown in FIG. 4, the stanchion assembly 30 comprises a pair of vertically oriented, spaced posts 31/31' mounted on concrete bases 22, the rear post 31 being longer (higher) than the front post 31'. A lower cross beam 44 connects the posts 31/31' proximate their base end, and an upper cross beam 42 connects the posts 31/31' proximate their upper end. The upper cross-beam 42 is angled due to the lower height of the front post 31'. Thrust plates 36/37 are attached via eye bolts (shown in FIG. 3) to the vertical posts 31/31' and the upper cross beam 42.

Referring to FIG. 4, two arrows are shown representing theoretical wind forces ("W") on the panels 4. As shown in FIG. 4, the wind forces "W" placed on the panels 4 are counteracted by tension forces on the catenary cables 6/6', 8/8' represented by dashed lines. As a result, the panels 4 are maintained in a secure position even during extreme weather events.

FIG. 5 shows a bottom view of three panels 4 suspended by respective hanger assemblies 14 on a cable 6 during installation, according to the invention. Referring to FIG. 5, the hanger assembly 14 is hooked around the frame 50 of the panel 4 and extends down the rear face of the panel 4 where it joins with a cable 6. During installation, the hanger assemblies 14 are used to position the panels 4 along the length of the cables 6/6', 8/8' at desired points. In addition, if a mid clamp or end clamp assembly 10/12 (shown in FIG. 7) should fail, the hanger assembly 14 serves as a back up to assist in retaining the panel 4 in position until repairs can be made.

FIGS. 6A-6D show components of the hanger assembly 14. FIG. 6A shows a top view of the hanger assembly 14 comprising an extended rectangular metal strap 52, a plurality of holes 68 defined within the body of the strap 62, and a pair of spaced bolts 60. FIG. 6D shows a side view of the hanger assembly 14. Referring to FIG. 6D, the hanger assembly 14 further comprises a hanger hook 54 and a hanger clamp 56 with cross sectional view of a cable 64 shown running through a curved section of the hanger clamp 56. FIG. 6B shows a top view of the hanger clamp 56, and FIG. 6C shows a top view of the hanger hook 54.

Referring to FIGS. 6A-6D, the hanger assembly 14 comprises a hanger strap 52 in partial overlap with a hanger hook 54 at a top end. The hanger hook 54 is shaped for insertion around a panel frame 50 (shown in FIG. 5). A nut and bolt 40/60 permit the hook 54 to be securely installed around frames of different widths. Most panels are manufactured with hollow frames; however, some panels have a square tubing frame. The hanger assembly 14 further comprises a curved generally U-shaped hanger clamp 56 secured to the strap 52 proximate a base end of the strap 52. The hanger clamp 56 is sized for encircling, but not firmly retaining, a cable 64. Referring to FIG. 6D, the cable 64 is permitted to move within an opening formed by the hanger clamp 56, the opening defined by the body of a bolt 60 and spacer 66, on the one hand, and the curved C-shaped clamp portion 56, on the other hand. The opening permits the cable 64 to move within the clamp 56 along a limited vertical axis. Once fully installed, the movement of the cable 64 is transferred to a movement of the panels 4 themselves to alleviate extreme stresses placed on the cables 6/6', 8/8' during extreme weather events.

Referring to FIGS. 6C and 6D, the hanger hook 54 defines a rectangular slot opening 58 sized for insertion of a bolt through the slot opening 58 and through a corresponding hole 68 defined in the hanger strap 52. The slot opening 58 permits slidable adjustment of the hook 54 relative to the strap 52 for different sized panels, different frame 50 designs, and different distances between the panel frames 50, on the one hand, and the top cable 64, on the other hand, during installation.

FIG. 7 shows a series of three panels 4 suspended on catenary cables 6/6', 8/8', the panels 4 joined to the cables 6/6', 8/8' by mid clamp assemblies 10 positioned between the panels 4, and end clamp assemblies 12 positioned on open side margins of the panels 4. Referring to FIG. 7, when the panels 4 are suspended generally parallel and spaced apart from each other, the respective side margins of the panels 4 define a central open region 46 between the panels 4 as well as opposing open end regions 48. The mid clamp assemblies 10 are installed within the central open regions 46 to flexibly connect the panels 4 to the cables 6/6', 8/8', whereas the end clamp assemblies 12 flexibly connect the panels 4 to the cables 6/6', 8/8' at the end regions 48.

FIG. 8A shows a top view diagram of an installed mid clamp assembly 10, according to the invention. FIG. 8B shows a side view diagram of the same mid clamp assembly 10. Referring to FIGS. 8A and 8B, the mid clamp assembly 10 comprises a separator clip 72 mounted to respective framed 50 side margins of the panels 4. A bolt 60 and a washer 62 are positioned within the central region 46 proximate the front surface of the panels 4. The body of the bolt 60 runs the length of the central region 46 though a spacer 66 and a cable clip 70. The cable clip 70 generally encircles the cable 64 shown in cross section in FIG. 8B.

Referring to FIG. 8B, the mid clamp assembly 10 further comprises a curved generally C-shaped cable clip 70. The cable clip 70 is sized for encircling, but not firmly retaining, a cable 64. Referring to FIG. 8B, the cable 64 is permitted to move within a limited space formed by a spacer 66, on the one hand, and the curved C-shaped cable clip 70, on the other hand. As with the hanger clamp (FIG. 6D), the space permits the cable 64 to move within the clip 70 along a limited vertical axis. Once fully installed, the limited movement of the cable 64 is transferred to a limited movement of the panels 4 themselves to alleviate extreme stresses placed on the cables 6/6', 8/8' during extreme weather events.

FIG. 9A shows a top view diagram of an installed end clamp assembly 12, according to the invention. The end clamp assembly 12 essentially embodies the same design as a mid clamp assembly 10, but serves to join only one side margin of an end panel to a cable, and further comprises an end clip 74. The end clip 74 is a U-shaped bracket that supports a portion of the compression force of the end clamp bolt 60. FIG. 9B shows a side view diagram of the same end clamp assembly 12.

Referring to FIGS. 9A and 9B, as with the mid clamp assembly 10, the end clamp assembly 12 comprises a separator clip 72 mounted to one framed 50 side margin of an end panel 4. The separator clip 72 is shaped with vertically-oriented (L-shaped) opposing margins to prevent a panel from slipping out from a mid clamp 10 and/or end clamp 12. Referring to the end clamp assembly 12 shown in FIGS. 9A and 9B, a bolt 60 and a washer 62 are positioned within the central region 46 proximate the front surface of the panel 4. The body of the bolt 60 runs the length of the central region 46 though a spacer 66 and a cable clip 70. The cable clip 70 generally encircles the cable 64 shown in cross section in FIG. 9B.

Referring to FIG. 9B, the end clamp assembly 12 further comprises a curved generally C-shaped cable clip 70. The cable clip 70 is sized for encircling, but not firmly retaining, a cable 64. Referring to FIG. 9B, the cable 64 is permitted to move within a limited space formed by a spacer 66, on the one hand, and the curved C-shaped cable clip 70, on the other hand.

Referring to FIG. 9B, as with the mid clamp assembly 10, the cable 64 installed within an end clamp assembly 12 is permitted to move within a limited space to alleviate extreme stresses placed on the cables 6/6', 8/8' during extreme weather events.

INDUSTRIAL APPLICABILITY

It is clear that the inventive Catenary Cable Solar Panel Suspension System of this application has wide applicability to the solar energy industry. The application of design science principles involving the use of tension and compression to solar panel systems results in a novel system that allows for the mounting of more panels using significantly less materials at a significantly lower cost.

The system replaces conventional mounting systems involving rails, anchoring feet, lag bolts, substantial superstructures and other hardware. The system of suspended panels easily integrates with existing electrical systems of buildings and other sites.

Fabrication of the system components is simple and costs are reduced by virtue of a design relying on simple geometries and readily available materials requiring minimal machining. System hardware may be produced locally with kits provided to installers at a reduced cost for minimal outlay of capital intensive equipment.

It should be understood that various modifications within the scope of this invention can be made by one of ordinary skill in the art without departing from the spirit thereof and without undue experimentation. For example, any suitable or desired materials may be used for the parts disclosed in this application. Alternate embodiments could include stanchions mounted at an angled incline relative to the ground, arrays of panels mounted from a series of secured poles, and arrays of panels mounted from existing vertical structures, for example, walls. The system may employ pairs of cables in identical centered catenary formation, or alternately, be installed to form a design wherein a distance between the first and second cables as determined by the cable cross ties, on the one hand, and the third and fourth cables, on the other hand, is at a minimum at a point along a length of the cables that is not equidistant between the stanchions. This invention is therefore to be defined as broadly as the prior art will permit, and in view of the specification if need be, including a full range of current and future equivalents thereof.

I claim:

1. A system of suspended photovoltaic modules relative to a surface, said system comprising:

at least two generally planar photovoltaic modules, each of said modules having a top margin, a bottom margin, a left margin and a right margin, a front surface, and a rear surface;

respective side margins of said modules when suspended generally parallel and spaced apart from each other defining a central open region between two modules and opposing open end regions;

a first pair of opposing, spaced cables comprising a first cable and a second cable, each of said cables having opposing ends;

a second pair of opposing, spaced cables comprising a third cable and a fourth cable, each of said cables having opposing ends;

a hanger assembly mounted to the rear surface of the module, said hanger assembly having a first end securely spanning the top margin of the module, and a second end encircling the first cable;

a first mid clamp assembly positioned within the central region retaining side margins of the modules, said first mid clamp assembly encircling the first cable;

a second mid clamp assembly positioned within the central region retaining side margins of the modules, said second clamp assembly encircling the third cable;

a series of end clamp assemblies positioned at the end region, each of said end clamp assemblies retaining a side margin of a module and encircling the first and third cables, respectively;

the cable ends securely attached under tension to spaced bolts on opposing end stanchions positioned at the end regions;

ground cables extending under tension from a surface mount to the stanchions;

a first plurality of spaced cable cross ties mounted generally perpendicular to the first and second cables, each of said first cable cross ties adjusted under a different tension to cause the first and second cables to take on a catenary shape between the two opposing stanchions;

a second plurality of spaced cable cross ties mounted generally perpendicular to the third and fourth cables, each of said bottom cable cross ties adjusted under a different tension to cause the third and fourth cables to take on a catenary shape between the two opposing stanchions;

whereby a level of tension in the first pair of cables acting in coordination with a level of tension in the second pair of cables supports the panels in an elevated position above the surface and prevents a catastrophic motion of the panels in a high wind condition.

2. The system of claim 1, further comprising at least one mid stanchion positioned between the opposing end stanchions, said mid stanchion retaining the first, second, third and fourth cables under tension.

3. The system of claim 1, wherein the stanchion comprises a pair of opposing thrust plates and an eye bolt.

4. The system of claim 1, wherein the stanchion comprises a pair of opposing thrust plates attached to opposing sides of the stanchion, said plates each having at least one hole defined therein, said holes positioned for counteracting an opposing set of tension forces applied to the stanchion by cables mounted to an eye bolt inserted within said holes.

5. The system of claim 1, wherein the stanchion comprises two spaced vertically oriented posts joined by a top and bottom cross beam, said top cross beam angled to form an inclined plane, each of said posts having a concrete pier block at a base end.

6. The system of claim 1, wherein the ground mount comprises an earth anchor.

7. The system of claim 1, wherein the hanger assembly comprises a hanger strap in partial overlap with a hanger hook at a top end, said hook shaped for insertion around a module frame, said assembly further comprising a curved generally U-shaped hanger clamp secured to the strap at a bottom end, said hanger clamp sized for encircling the first cable and permitting a limited movement of the module in a vertical direction.

8. The system of claim 1, wherein the hanger assembly comprises a hanger hook, said hook comprising a slot opening sized for insertion of a bolt through the slot opening and through a corresponding opening defined in a hanger strap, said slot opening permitting slidable adjustment of the hook relative to the strap.

9. The system of claim 1, wherein the first and second mid clamp assemblies comprise a separator clip mounted to respective side margins of modules, a bolt and washer positioned within the central region proximate the front surface of the modules, a body of the bolt running a length of the central region though a spacer and a cable clip, said cable clip generally encircling the first or third cable.

10. The system of claim 1, wherein the end clamp assemblies comprise a separator clip, said clip mounted to the side margins of the module, a bolt and washer positioned within the end region proximate the front surface of the module, a body of the bolt running a length of the end region though a spacer and a cable clip, said cable clip generally encircling the first or third cable.

11. The system of claim 1, wherein the modules are selected from the group consisting of: monocrystalline silicon panel, polycrystalline silicon panel, string ribbon silicon panel, thin-layer silicon panel, amorphous silicon panel, concentrator module, high-efficiency multi-junction module, flat-plate stationary array, adjustable array, portable array, tracking array, reflector module.

12. The system of claim 1, wherein the surface is selected from the group consisting of: earth, asphalt, composition, metal, tile, structural insulated panel, deck.

13. The system of claim 1, wherein the catenary shape of the cables is maximized along a length of the cables at a mid point generally equidistant between the stanchions.

14. The system of claim 1, wherein a distance between the first and second cables as determined by the cable cross ties, on the one hand, and the third and fourth cables, on the other hand, is at a minimum at a midpoint equidistant between the stanchions.

15. The system of claim 1, wherein a distance between the first and second cables as determined by the cable cross ties, on the one hand, and the third and fourth cables, on the other hand, is at a minimum at a point along a length of the cables that is not equidistant between the stanchions.

16. The system of claim 1, wherein a base of the stanchion and the surface mount comprise a buried concrete block.

17. The system of claim 1, wherein the suspended modules define a generally consistent inclined plane between the stanchions.

18. The system of claim 1, wherein the suspended modules define a generally concave plane between the stanchions.

19. The system of claim 1, wherein the modules have a defined distance of potential movement relative to the cables.

20. The system of claim 1, wherein the stanchions are mounted at an angled incline relative to the surface.

* * * * *